United States Patent [19]

Vaughn

[11] Patent Number: 5,468,052
[45] Date of Patent: Nov. 21, 1995

[54] SISSY BAR KIT FOR POST-MANUFACTURE INSTALLATION ON A MOTORCYCLE

[76] Inventor: Steven Vaughn, 13 Vaughn Ter., Saugerties, N.Y. 12477

[21] Appl. No.: 265,942

[22] Filed: Jun. 27, 1994

[51] Int. Cl.⁶ ..................................................... A47C 15/00
[52] U.S. Cl. .................. 297/352; 297/195.1; 297/215.11
[58] Field of Search ..................................... 297/352, 195, 297/215.11, 215.1; 280/293, 288.4, 304.3, 305.5; 224/39

[56] References Cited

U.S. PATENT DOCUMENTS

| Re. 33,178 | 3/1990 | Ahlberg | 297/215.11 X |
| 3,425,745 | 2/1969 | Michels | 297/215.11 |
| 3,861,741 | 1/1975 | Kaufman | 297/215.11 |
| 4,466,660 | 8/1984 | Mabie | 297/215.11 |

FOREIGN PATENT DOCUMENTS

| 2378672 | 8/1978 | France | 297/215.11 |

*Primary Examiner*—Laurie K. Cranmer

[57] ABSTRACT

A sissy bar kit for post-manufacture installation on a motorcycle, which sissy bar kit includes a sissy bar and a support member for ready installation on a wide variety of existing motorcycles.

4 Claims, 3 Drawing Sheets

SISSY BAR KIT FOR POST-MANUFACTURE INSTALLATION ON A MOTORCYCLE

BACKGROUND OF THE INVENTION

The present invention relates to sissy bars for motorcycles and, more specifically, to a sissy bar kit for installation of a sissy bar on a motorcycle after manufacture.

Sissy bars are known in the motorcycle industry. A sissy bar serves various purposes. To a limited degree, a sissy bar may serve as a backrest for a passenger on a motorcycle. A sissy bar is, without doubt, ornamental and most decidedly serves the purpose of attaching luggage to the fender of a motorcycle and can be used as a hand grip.

Sissy bars are available today for use on motorcycles. However, a post-manufacture sissy bar which can be safely, securely and inexpensively mounted on an existing motorcycle is not readily available.

Manufacturers of motorcycles provide for sissy bars which can only be installed on the motorcycle at the time of manufacture or can only be installed after manufacture only by extensive and expensive reconstruction of the motorcycle.

Motorcyclists who wish to make their motorcycles more attractive and to provide a secure and safe sissy bar to the rear of the passenger seat are not able to obtain a readily available, economical sissy bar which can be securely and safely fastened to an existing motorcycle with a minimum of installation requirements. This not having been accomplished in the past, the present invention overcomes this lack of availability and provides a unique and novel, attractive unit which is economical and readily installable.

SUMMARY OF THE INVENTION

The present invention provides a novel apparatus in the form of a sissy bar kit for post-manufacture installation of a sissy bar on an existing motorcycle to provide all of the features of a sissy bar built as part of the motorcycle when manufactured. The sissy bar kit includes the bar, which is the known inverted U-shaped bar referred to as a sissy bar, and which slopes toward the rear of the motorcycle at an acute angle from the horizontal. Preferably, a backrest is located between the lower ends of the bar to provide, at least in the preferred embodiment, a backrest for the small of the back of a passenger on the motorcycle. On the lower ends of the bar lugs are provided with bolt holes through them.

The sissy bar kit also includes a support member having a generally rounded configuration for placement beneath the fender of a motorcycle and having protrusions with a generally horizontal flat surface on the lower surface of the member and with openings through the member at the protrusions, which openings are aligned with the openings on the lower surface of the member in the lugs of the bar. A gasket is also included for use between the sissy bar and the fender of the motorcycle on which the sissy bar is installed.

By drilling two holes in the fender of a motorcycle aligned with the openings in the lugs and the member, the sissy bar kit can be installed on an existing motorcycle.

DETAILED DESCRIPTION OF THE PREFERRED EMBODIMENT

Figure 1:
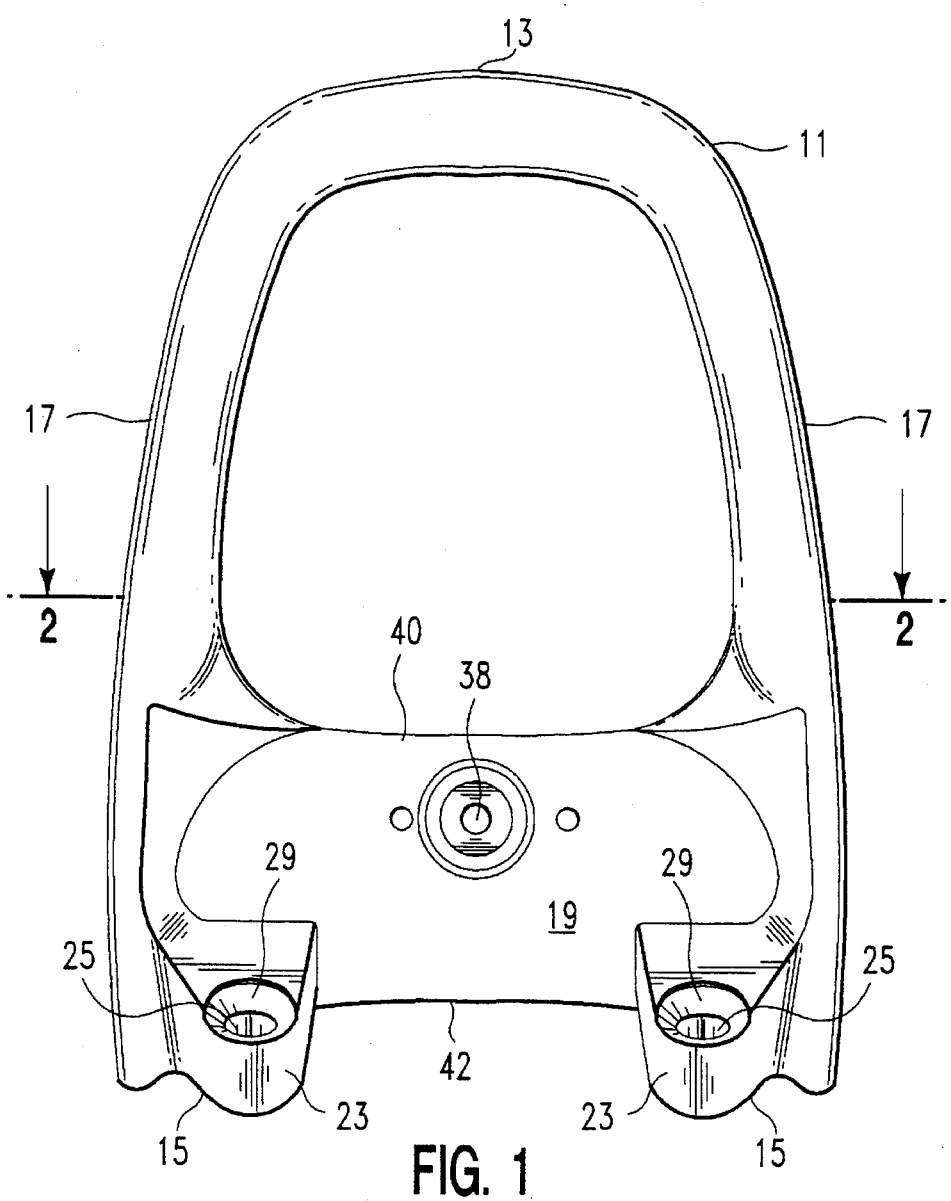
FIG. 1 is a front elevation of the sissy bar showing the lugs with the openings therein, and the back plate upon which a pad can be mounted.
Figure 2:
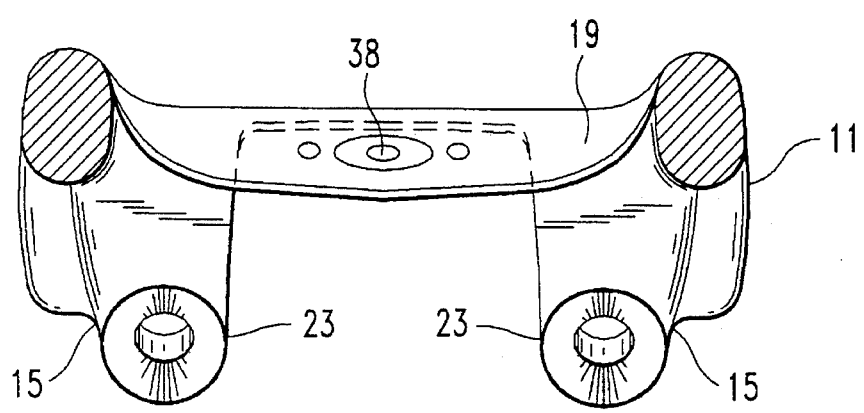
FIG. 2 is a cross-sectional view taken along lines 2—2 of FIG. 1, showing the backside of the back plate and also showing the lugs.

FIG. 1 shows a bar 11 generally referred to as a sissy bar, which is part of the sissy bar kit contemplated by this invention, in its generally well-know configuration of an inverted U. The bar 11 itself has an upper end 13, which is rounded and two lower ends 15. The bar 11 is preferably metallic and must have substantial structural strength and is shown with a general U-shape, having two legs 17 which generally slope inwardly toward one another and then bend to join one another at the upper end 13. As best seen in FIGS. 1, 2, 5 and 6, a back plate 19 is rigidly secured between the legs 17 at the lower ends 15 of the bar 11. A back plate 19 extends from the lower ends 15 of the bar 11 only a minor portion of the length of the legs 17 of the bar 11 toward the upper end 13. The back plate 19 serves to provide added structural strength to the bar 11 and primarily serves as a support for a cushion 21. The back plate 19 is securely fastened to the two legs 17 and preferably is formed with the legs 17.

At the lower ends 15 of the legs 17 and extending forward from the legs 17 are a pair of lugs 23 with each of the legs 17 having one separate lug 23. Each lug 23 has an opening 25 in it which is essentially a round bolt hole. The lugs 23 are stubby and short being only sufficiently long to be adequate for a single bolt hole. The lugs 23 are preferably rounded about the bolt hole to form a journal in which a bolt 27 can be placed and are secured rigidly to the bar 11, also preferably being formed with the bar 11 in manufacture. The openings 25 have a tapered top 29 to permit use of a bolt 27 with a flat head which tapers to the shank of the bolt 27. The bolt 27 secures the bar 11. With use of a bolt 27 with a flat head, the bolt 27 is recessed within the lug 23.

Figure 6:
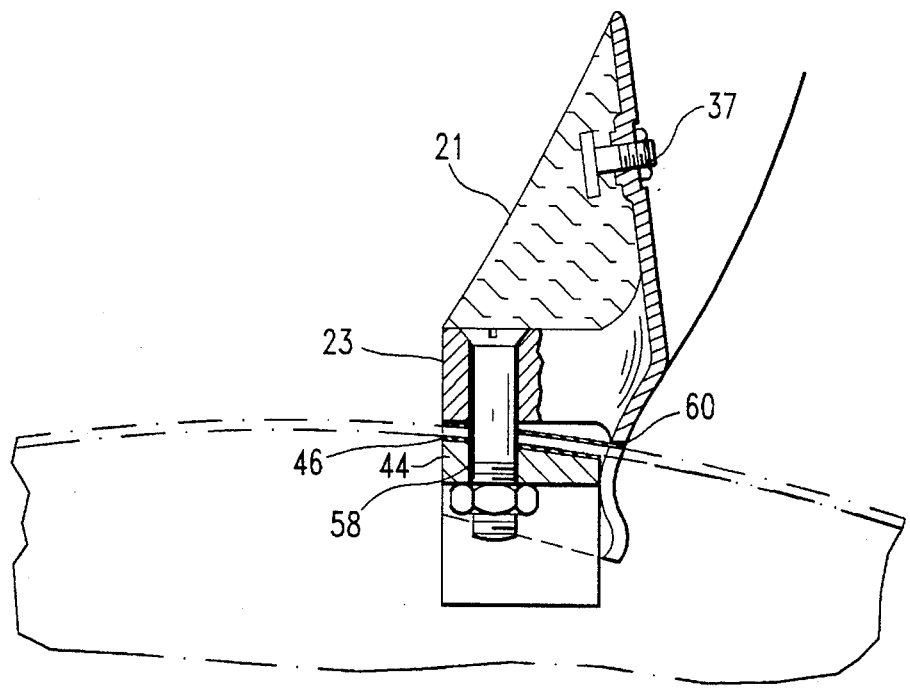
FIG. 6 is a cross-sectional view taken along line 6—6 of FIG. 5.

As best seen in FIG. 6, the plane in which the lugs 23 of the bar 11 are located approaches being at right angles with the plane of the back plate 19, but the back plate 19 is located at an acute angle to the longitudinal axis of the legs 17 of the bar 11. The legs 17 of the bar 11 are in a plane at an obtuse angle to the plane of the lugs 23. In this way, when the lugs 23 are mounted upon the fender 33 of a motorcyle 35, the legs 17 of the bar 11 extend backwards at an acute angle to the vertical and the back plate 19 is very generally in a vertical plane. When mounted, both legs 17 slope slightly to the rear of the motorcycle 35 from the vertical.

Figure 3:
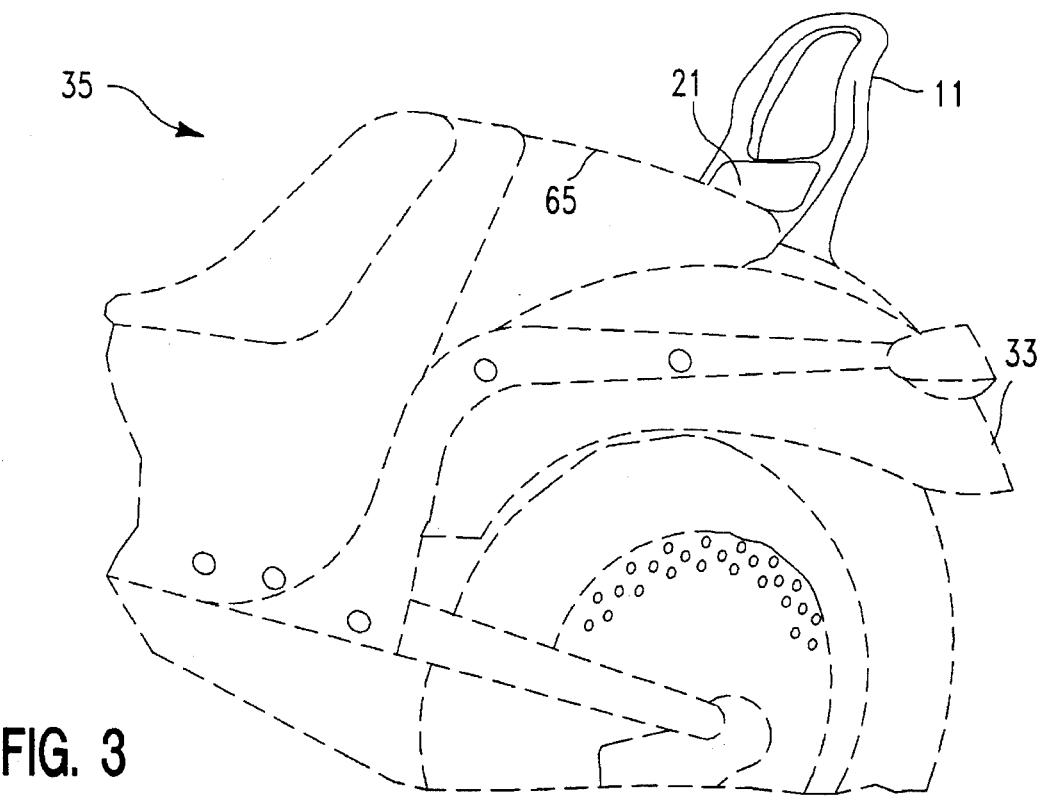
FIG. 3 is a perspective view of the sissy bar shown in place immediately to the rear of the passenger seat mounted on the fender of a motorcycle.

As shown in FIG. 3, the sissy bar 11 bows backwards and forwards as it extends upwardly from the fender 33 of the motorcycle 35. This, of course, is strictly a matter of choice, and although it may make for a more attractive sissy bar 11, a straight tube can be used, or other artistic bends can be provided, which are distinctive from those shown and still provide a suitable sissy bar 11 providing the basic features of an inverted U-shaped design is maintained.

When in use, the cushion 21, best seen in FIG. 6, is affixed to the back plate 19 and held in place by means of a cushion bolt 37 extending from the back of the cushion 21 through and opening 38 in the back plate 19. Other means of securing the cushion 21 to the back plate 19 may also be used.

It should be noted as shown in FIG. 1 that the back plate 19 has an upper edge 40 and a lower edge 42 and the lower edge 42 is concave to fit readily upon the fender 33 of the motorcycle 35.

Figure 4:
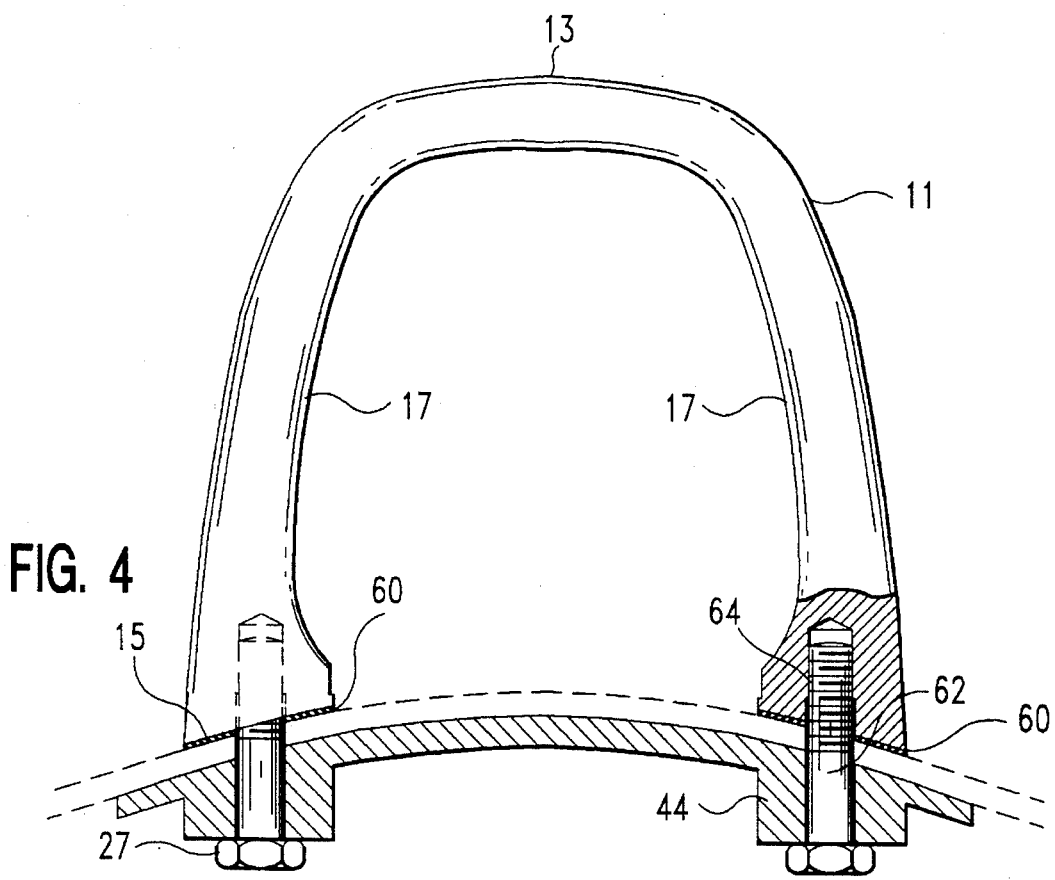
FIG. 4 is a front elevation of an alternate embodiment of the sissy bar which shows a simplified sissy bar having no backrest.
Figure 5:
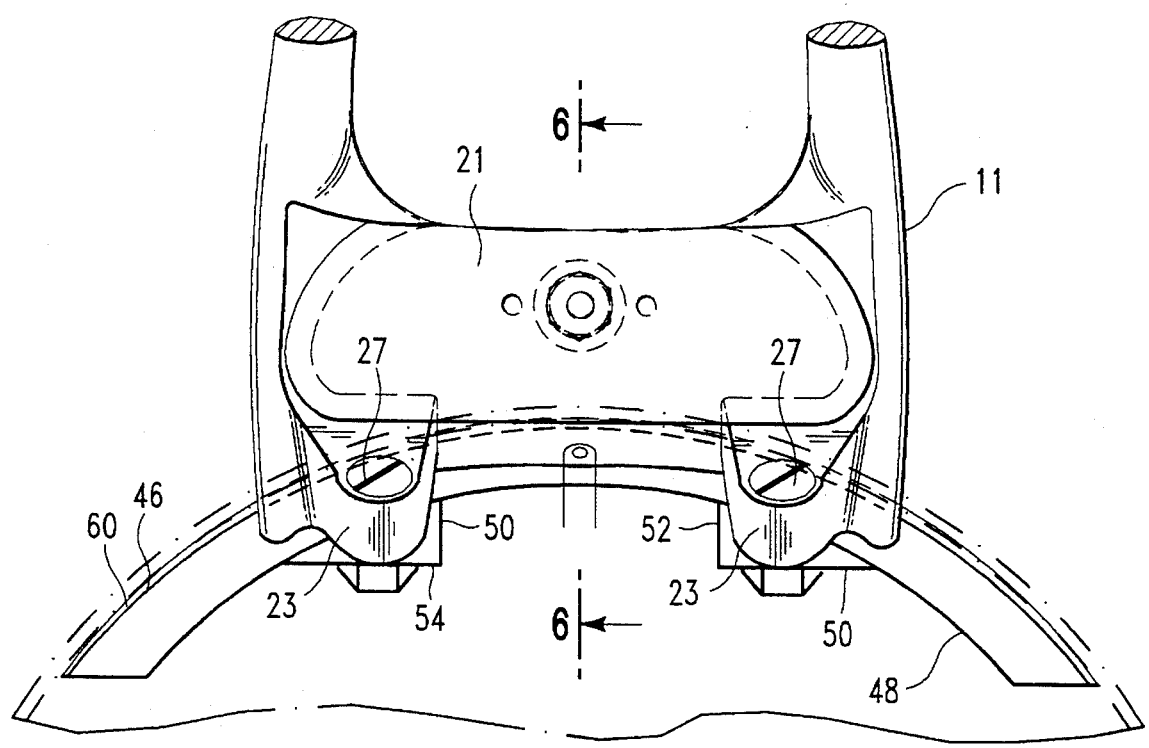
FIG. 5 is a front elevation of the lower portion of the sissy bar mounted on the rear fender of a motorcycle showing the support member and gasket with the bolts through the lugs of the sissy bar and the support member.

Referring to FIGS. 4 and 5, in mounting the bar 11 on the fender 33 of a motorcycle 35, a support member 44 is placed beneath the fender 33. The support member 44 has an upper surface 46 which is convex and a lower surface 48 which is concave with two protrusions 50 extending from the lower surface 48. The two protrusions 50 are essentially angular extensions each having a straight vertical surface 52 and a horizontal surface 54 when the support member 44 is in place. The horizontal surfaces 54 serve as flats upon which a bolt nut 56 can be securely seated. Openings 58 are formed through the support member 44 at the point of the protrusions 50 and such openings 58 extend through such protrusions 50. One such opening 58 is formed through each protrusion 50 and the openings 58 in the protrusions 50 and the support member 44 are spaced to be aligned with the openings 25 in the lugs 23 of the bar 11. A gasket 60 is also provided between the lower ends 15 of the bar 11 and the fender 33. The gasket 60 is shaped in accordance with the configuration of the bar 11 in contact with the fender 33. In this way, the bar 11 can be mounted on the fender 33 and secured firmly and safely by bolts 27 which tightly compress the bar 11 and the support member 44 together against opposite surfaces of the fender 33 with the gasket 60 between the bar 11 and the fender 33.

An alternate embodiment of the sissy bar 11 is shown on FIG. 4. The alternate embodiment is a simplified version of the preferred embodiment.

Essentially the configuration of the bar 11 and the support member 44 is the same. The gasket 60 is used in the same manner but shaped to conform to the configuration of the bar 11 in that form.

The main difference is that the bar 11 in the simplified version has no lugs 23. Instead of lugs 23, stud holes 62 are formed in the lower ends 15 of the legs 17 and threads 64 are tapered into the stud holes 62. The bolts 27 are inserted through the support member 44, the fender 33 and the gasket 60 into the stud holes 62 to engage the threads 64 to secure the bar 11 in the simplified form to the fender 33.

The sissy bar kit once installed can serve more than the usual advantages of a sissy bar 11. It is well known that a motorcycle seat 65 is removable from the motorcycle 35 and are secured at the front and rear by means of pins (not shown) which latch the seat 65 to the motorcycle 35. Although this is convenient for removing the seat 65, or replacing the seat 65, a motorcycle 35 left unattended can readily have the seat 65 stolen. By placing the sissy bar 11, with the cushion 21 affixed to the back plate 19, on the fender 33, the cushion 21 will extend just over the back end of the seat 65. As best seen in FIG. 3, in this way the cushion 21 covers the pin located at the rear of the seat 65 holding the seat 65 in place and prevents removal of the pin thereby avoiding the removal of the seat 65 unless either the sissy bar 11 is removed or at least the cushion 21 is removed from the sissy bar 11. Although this does not create an absolute safeguard against theft of the seat 65, it serves as a further step in delaying the removal of the seat 65 from the motorcycle 35.

The foregoing disclosure and description of the invention are illustrative and explanatory thereof, and various changes in the size, shape and materials as well as in the details of the illustrated construction may be made without departing from the spirit of the invention, all such changes being contemplated to fall within the scope of the appended claims.

I claim:

1. A sissy bar kit for installation on the rear fender of an existing motorcycle, said kit comprising:

a bar with an inverted U-shape; said bar having a longitudinal axis and having an upper end and two lower ends; the upper end being rounded, said bar including a pair of lugs rigidly mounted on the lower end of the bar, and lying in a plane at an obtuse angle to the longitudinal axis of the bar, each lug having an opening extending through it substantially at right angles to the plane of the lugs, said bar further including a back plate extending between the two lower ends of the bar, the back plate being substantially in a plane at an acute angle to the longitudinal axis of the bar, the back plate having a lower edge which is concave;

a cushion mounted on the back plate above the lugs;

a support member which has a upper surface which is convex and a lower surface which is concave, the upper surface and the lower surface being generally equispaced from one another, the support member having two protrusions which are generally symetrically located on the lower surface, each protrusion having a flat vertical surface and a flat horizontal surface and the flat horizontal surfaces of both protrusions lying substantially in the same plane, the support member having a pair of openings extending through the support member at the protrusions, such openings through the support member having a longitudinal axis which is generally at right angles to the plane of the flat horizontal surfaces, the pair of holes through the support member being aligned with the openings in the lugs; and bolt means to extend through the openings in the lugs and the openings in the support member.

2. A sissy bar kit according to claim 1 wherein the lugs have a top surface remote from the support and the openings through the lugs are tapered adjacent the top surface.

3. A sissy bar kit according to claim 1 further including a pair of gaskets, one gasket having the same configuration as one lower end of the bar and the other gasket having the same configuration as the other lower end of the bar, each gasket having an opening through it to align with openings in the lugs and the support member.

4. A sissy bar kit for installation on the rear fender of an existing motorcycle, said kit comprising:

a bar with an inverted U-shape; said bar having a longitudinal axis and having an upper end and two lower ends; the upper end being rounded, each lower end of the bar having a stud hole extending generally along the longitudinal axis of the bar from the lower end, such stud hole being threaded:

a support member which has a upper surface which is convex and a lower surface which is concave, the upper surface and the lower surface being generally equispaced from one another, the support member having two protrusions which are generally symetrically located on the lower surface, each protrusion having a flat vertical surface and a flat horizontal surface and the flat horizontal surfaces of both protrusions lying substantially in the same plane, the support member having a pair of openings extending through the support member at the protrusions, such openings through the support member having a longitudinal axis which is generally at right angles to the plane of the flat horizontal surfaces, the pair of holes through the support member being aligned with the openings in the lugs;

a pair of gaskets, one gasket having the same configuration as one lower end of the bar and the other gasket having the same configuration as the other lower end of the bar, each gasket having an opening through it; and bolt means to extend through the openings in the support member and the gaskets to be threaded into the stud holes in the lower ends of the bar.

* * * * *